(12) United States Patent
Fabian et al.

(10) Patent No.: US 12,680,957 B2
(45) Date of Patent: Jul. 14, 2026

(54) METHOD OF GENERATING A FLUORESCENT PROPERTY IN A MATERIAL USING A LASER

(71) Applicant: Giesecke+Devrient ePayments GmbH, Munich (DE)

(72) Inventors: Cristina Fabian, Munich (DE); Klaus Kohl, Munich (DE); Josef Riedl, Munich (DE)

(73) Assignee: Giesecke+Devrient ePayments GmbH, Munich (DE)

( * ) Notice: Subject to any disclaimer, the term of this patent is extended or adjusted under 35 U.S.C. 154(b) by 134 days.

(21) Appl. No.: 18/917,037

(22) Filed: Oct. 16, 2024

(65) Prior Publication Data

US 2025/0146936 A1      May 8, 2025

(30) Foreign Application Priority Data

Oct. 17, 2023    (DE) .......................... 102023128446.0

(51) Int. Cl.
*G01N 21/64* (2006.01)

(52) U.S. Cl.
CPC ..... *G01N 21/6402* (2013.01); *G01N 21/6456* (2013.01); *G01N 2021/6463* (2013.01); *G01N 2201/06113* (2013.01)

(58) Field of Classification Search
None
See application file for complete search history.

(56) References Cited

U.S. PATENT DOCUMENTS 3,566,114 A    *    2/1971   Brewer .............. G01N 21/6486
                                                        250/365
2019/0145883 A1*   5/2019   Burriel .............. G01N 15/1436
                                                        250/435
2021/0172851 A1*   6/2021   Lincoln ................. G01S 7/4812

(Continued)

FOREIGN PATENT DOCUMENTS

EP        1372975 B1     1/2007
EP        1322478 B1     2/2010
EP        2918424 A1     9/2015

(Continued)

OTHER PUBLICATIONS

Scientific Reports "Ultra-high density optical data storage in common transparent plastics"; Published May 25, 2016; Deepak L. N. Kallepalli, Ali M. Alshehri, Daniela T. Marquez, Lukasz Andrzejewski, Juan C. Scaiano & Ravi Bhardwaj; www.nature.com/scientificreports; DOI: 10.1038/srep26163.

(Continued)

*Primary Examiner* — Hoon K Song
(74) *Attorney, Agent, or Firm* — LNK LAW, PLLC

(57) ABSTRACT

A method for generating an at least partial fluorescent property in a material is provided. The method comprises providing the material, providing a laser, arranging the material in a beam path of the laser such that the laser can selectively section wise irradiate the material, and at least section wise irradiating a surface of the material with the laser. The at least sectionwise irradiating of the surface of the material with the laser is performed until visible traces of smoke are formed on the irradiated areas of the surface of the material, whereby a fluorescent property is generated in the irradiated areas.

15 Claims, 2 Drawing Sheets

(56) References Cited

U.S. PATENT DOCUMENTS

2022/0146397 A1* 5/2022 Perez Lopez ........ G01N 1/2205

FOREIGN PATENT DOCUMENTS

| EP | 2050046 | B1 | 7/2020 |
| EP | 3697623 | B1 | 7/2022 |
| JP | 448926 | B2 | 4/2010 |
| JP | 4448926 | B2 | 4/2010 |

OTHER PUBLICATIONS

Kaellepalli, Deepak L. N. et al. "Ultra-high density optical data storage in common transparent plastics." Sci. Rep. 6, 26163; doi: 10.1038/srep26163 (2016).

* cited by examiner

METHOD OF GENERATING A FLUORESCENT PROPERTY IN A MATERIAL USING A LASER

CROSS-REFERENCE TO RELATED APPLICATION

This application claims priority to German Application No. 102023128446.0, filed Oct. 17, 2023, which is hereby incorporated in its entirety by reference.

TECHNICAL FIELD

The present disclosure relates generally to fluorescent properties in a material and more specifically to a method for generating a fluorescent property in a material using a laser.

TECHNICAL BACKGROUND

Card-shaped data carriers such as identity cards (e.g. ID cards and driving licenses), data pages in a passport, payment cards (e.g. credit cards, debit cards, etc.) but also value documents such as banknotes often have a variety of security features to increase counterfeit protection. Such security features include, for example, holograms, laser tilt images, color tilt effects (e.g. optically variable colors), security threads, contrast reversal effects, micro lettering, guilloches, UV prints, 3D effects and fluorescent features, to name just a few examples. Fluorescent features in particular are usually achieved by introducing fluorescent pigments, which are contained in printing colors, films, inks, etc., for example. For example, card-shaped data carriers such as identity documents usually consist of a multi-layer structure, with different opaque and transparent layers laminated together. In order to achieve a fluorescent effect, for example in security features, appropriate pigments are usually introduced and laminated into the layer structure between suitable layers or applied to the surface. Additional substances must therefore be applied/introduced into or onto the material.

DESCRIPTION

It is thus an objective of the present disclosure to generate an at least partial fluorescence effect in a material without having to introduce additional substances into the material.

This objective is solved by the subject-matter of the independent claims. Exemplary embodiments result from the dependent claims and the following description.

According to an aspect, a method for generating an at least partial fluorescent property in a material is provided. The method comprises providing the material, providing a laser, arranging the material in a beam path of the laser, such that the laser can selectively section wise irradiate the material, and at least section wise irradiating a surface of the material with the laser. The at least section wise irradiating of the surface of the material with the laser is performed until traces of smoke form on the irradiated areas of the surface of the material, whereby a fluorescent property is generated in the irradiated areas.

The present disclosure is based on irradiating certain materials with a laser under certain conditions changes the corresponding material in such a way that a fluorescent property is inherently imparted/introduced into the material. In particular, such a fluorescent property can be useful as a security feature in card-shaped data carriers, such as identity cards or payment cards. The fluorescent property is generated simply by irradiating the material with a laser, without the need to introduce/apply additional substances such as corresponding color pigments. This allows to generate fluorescence, especially after the material, such as a card-shaped data carrier, has already been produced, in a simple way.

Fluorescence is generally understood to be the spontaneous emission of light shortly after a material is excited by light. Thereby, the emitted photons are usually lower in energy than the previously absorbed photons. Physical systems in which fluorescence occurs are called fluorophores. Fluorescence must be distinguished from phosphorescence. In contrast to phosphorescence, fluorescence involves permitted transitions between two electronic states. The excited states therefore have a short lifetime and the fluorescence fades after a short time. It is assumed that irradiating the material with a laser chemically changes the material in such a way that it exhibits fluorescence properties. Molecules with conjugated double bonds in particular show fluorescence, as the electrons move across several atoms and are therefore easy to excite. It is therefore assumed that the material is chemically altered when irradiated with the laser under the right conditions. $CO_2$ lasers and fiber lasers in particular have proven to be effective in generating fluorescence, as described below. However, other types of laser are also conceivable in principle.

It has been found that a certain amount of visible traces of smoke on the material surface is necessary to generate the fluorescence property. The term "traces of smoke" refers to a certain degree of yellowish discoloration of the surface, which is caused by the laser energy applied and the associated combustion processes on the surface. These traces of smoke do not necessarily have to be visible to the naked eye but it is also sufficient, for example, if they are visible with aids such as microscopes or similar. However, it has been shown that the stronger the traces of smoke, the stronger the fluorescence property. However, if a limited amount of smoke is produced, it can be removed again later so that it is no longer visible when viewed in daylight.

An at least partial fluorescence property is understood to mean a section wise fluorescence property on the material, which is achieved by section wise irradiating the surface. For example, a specific pattern or motif can be irradiated/scanned with the laser, which generates a corresponding fluorescence of this pattern.

To irradiate the material, the laser can be operated with a suitable laser power and moved over the material accordingly (optionally with a corresponding laser pulse frequency). The laser power and the "scanning rate" of the surface are coordinated in such a way that sufficient energy is introduced into the material to produce the corresponding chemical changes, but not too much energy, which would damage or destroy the material. The exact laser parameters depend on the irradiated material and the type of laser and can be determined in experiments, for example. In general, the laser parameters are correctly selected if a certain, but not too large, amount of traces of smoke are visible on the surface.

According to one embodiment, the laser is one of a $CO_2$ laser and a fiber laser.

These types of lasers have proven to be particularly effective/useful and thus as preferred for generating the fluorescence property, especially in the case of card-shaped data carriers (or materials commonly used in these card-shaped data carriers, as described below).

A $CO_2$ laser (or carbon dioxide laser), also known colloquially as a carbon laser, refers to a laser class of various designs from the group of gas, molecular and infrared lasers in the mid-infrared range. Its laser medium is carbon dioxide with a 4-level system. $CO_2$ lasers can generally achieve output powers of up to 80 kW and pulse energies of up to 100 kJ. A $CO_2$ laser produces a beam of infrared light with a wavelength in the 9.6 and 10.6 µm bands. $CO_2$ lasers are generally known in the state of the art, which is why their exact mode of operation will not be discussed in detail here.

A fiber laser is a special form of solid-state laser. The doped core of a glass fiber forms the active medium in a fiber laser. It is therefore a glass laser with fiber optic properties. The laser radiation, which is guided through the laser-active fiber, is very highly amplified due to the great length of the fiber. Fiber lasers are generally optically pumped by coupling radiation from diode lasers parallel to the fiber core into the cladding of the fiber core or into the fiber core itself. Double clad fibers allow higher powers; the pump radiation is distributed from the thick cladding into the active fiber core. The most common doping element for the laser-active fiber core is erbium, followed by ytterbium and neodymium for high-power applications. Fiber lasers have unique properties, such as electrical-optical efficiencies of up to over 30%, outstanding beam quality (with $M^2<1.1$ for single-mode fiber lasers, $M^2<1.2$ for double-clad fibers), long service life (>20,000 h) and a compact, maintenance-free and robust design. Pulsed operation extends into the fs range and can achieve a high peak intensity. Fiber lasers are also known in principle, which is why their exact mode of operation will not be discussed in detail.

According to a further embodiment, if the laser is a $CO_2$ laser, the $CO_2$ laser is operated with a power of between 60 W and 100 W and a wavelength of 10.6 µm. If the laser is a fiber laser, the fiber laser is operated with a power of between 20 W and 30 W and a wavelength of 1064 nm.

These operating parameters have proven to be particularly effective and therefore preferred, especially when applying the method to card-shaped data carriers (or their materials). In particular, these operating parameters introduce sufficient energy into the material to change the material accordingly, such that the fluorescence property is generated without damaging the material. However, these values are merely exemplary and other laser parameters are also conceivable in principle. The most preferred parameters depend in particular also on the irradiated material.

According to a further embodiment, the irradiating of the surface of the material is carried out with a pulsed laser.

In particular, the energy input can for example also be adjusted via the pulse frequency. For example, a fiber laser can be operated with a pulse frequency between 25 kHz-600 kHz with full power or 1 kHz to 25 kHz with linearly reduced power. A pulse energy of approximately 0.8 mJ results at a repetition rate of 25 kHz. A $CO_2$ laser, for example, can be operated with a pulse frequency of up to 100 kHz. However, it should be noted that the process also works with non-pulsed lasers. However, a pulsed laser enables more precise control of the amount of energy applied.

According to a further embodiment, irradiating the surface of the material comprises at least irradiating the surface under a first angle to generate a first fluorescence and irradiating the surface under a second angle to generate a second fluorescence to thereby generate a direction-dependent fluorescence property such that the respective fluorescence is only visible at the respective viewing angle.

In particular, irradiating a material or its surface at an angle generates a fluorescent property that is visible when viewed at this angle. When irradiated at different angles, a kind of fluorescent tilting image can be generated, which looks different when viewed at different angles (Multiple Laser Image, MLI). For example, a person's first name could be visible as fluorescent information at the first angle and the person's surname at the second angle. However, this is only one example and all conceivable different motifs can be selected.

It is also conceivable to irradiate the surface of the material at more than one angle in order to provide a variety of information at different viewing angles.

This type of configuration is particularly suitable as a security feature, for example for identity cards/documents such as ID cards, employee ID cards, passports, etc.

According to a further embodiment, the material is a card-shaped material.

The term "card-shaped data carrier", as used herein, includes all card-shaped data carriers that carry some form of data. The term "data" does not necessarily mean only digital data, but also print data or other data, for example in text or image form, such as civil status data as contained on a passport or identity card or other identity document. However, such data carriers may also include digital data instead or in addition, such as data stored on a card chip (e.g. in the case of a payment card/credit card).

Identity documents in particular often comprise a large number of security features. Fluorescent effects have so far been achieved by introducing additional substances containing fluorescent pigments (for example in printing colors, films, inks, etc.). This requires an additional production step. The present method, on the other hand, enables production of the card-shaped data carriers without this additional production step and a personalization after production is complete. The generation of fluorescent effects by means of a laser has the advantage that no additional production step such as the introduction/application of fluorescent colors in or on the card is required. Furthermore, the laser-based generation of fluorescent effects offers the advantage of design versatility, as the fluorescent effects can be generated anywhere on the front and/or reverse side. The fluorescent effects can be created over the entire surface or only in sections.

According to a further embodiment, the card-shaped material comprises a layered structure having several layers laminated together.

Card bodies of e.g. card-shaped data carriers can, for example, have a laminate structure comprising seven films (transparent film-transparent film-opaque film-transparent film-opaque film-transparent film-transparent film). However, this is only an example and other layer structures are also possible. The layer structure, usually in the form of a sheet, can be pressed using a laminating press. The sheet can then be cut into the individual card bodies of the card-shaped data carriers. If necessary, the individual card-shaped data carriers can be punched in a window area so that a so-called card insert can then be inserted into the punched-out area.

The present method can be applied both to the finished layered structure and to individual layers of the card-shaped material before the individual layers are laminated together.

According to a further embodiment, the card-shaped material is a card-shaped data carrier.

With such a card-shaped data carrier, but also with any other suitable data carrier or document, a black and white portrait, for example, can also optionally be produced by means of a laser as well as an inscription in such a card-shaped data carrier. The material of at least individual layers has corresponding carbon black particles which stop the laser beam and thus "capture" the laser energy and lead to a discoloration of the material at this point due to the laser energy. The black and white portrait can then be overprinted in color using DoD (drop-on-demand), for example, to create a color portrait (so-called CLIP ID). If necessary, a film patch with microlens security elements or micromirror security elements can also be applied. However, it should be noted that the generation of fluorescence is generally independent of the presence of carbon black particles and also functions in materials without carbon black particles. However, the disclosed method can be used in addition to inscriptions/personalization by means of such carbon black particles in order to enable further personalization, for example with security features.

It is also conceivable, for example, to give such a motif or text an additional fluorescent effect with the present process, for example by "tracing" the portrait with the laser of the present process. This further increases the already high level of counterfeit protection.

According to a further embodiment, the card-shaped data carrier is one of an identity card, a data page of a passport, a driver's license and a payment card.

Such card-shaped data carriers often have a large number of security elements. The present process makes it possible to produce additional fluorescent security features with a wide variety of designs. In particular, the overall finished and personalized data carriers can be provided with fluorescent effects in a finishing process. Such a finishing process could, for example, also be carried out separately from the actual production, e.g. at the customer's premises.

According to a further embodiment, the section wise irradiating of the surface is carried out according to a pattern or motif in order to generate a corresponding fluorescent motif.

For this purpose, the laser can "trace", i.e. scan over, the corresponding motif with the appropriate laser parameters, for example. Such a motif can optionally be planned automatically in a computer (e.g. using a photo or other template) and the laser can be controlled accordingly.

According to a further embodiment, the irradiated areas irradiated during the irradiating are selected such that the generated fluorescence property serves as a safety feature.

For example, the irradiated areas can be designed according to a photo of the owner or another suitable motif. It is also conceivable that texts could be designed accordingly.

According to a further embodiment, the method further comprises removing the traces of smoke from the surface after irradiating.

The traces of smoke can be removed, for example, by rubbing, grinding, polishing or any other suitable method. As a result, the imprinted fluorescence (i.e. an imprinted motif, for example) is only visible with the appropriate light used to excite the fluorescence, but not without such excitation. Tests have shown that the imprinted/generated fluorescence property is retained even after the traces of smoke have been removed.

According to a further embodiment, the material comprises at least one of the following materials: opaque and/or transparent polycarbonates (PC), refined materials, opaque and/or transparent polyethylene terephthalate (PET), acrylonitrile butadiene styrene copolymer (ABS), bio polycarbonates (PC), and polyvinyl chloride (PVC).

These materials are some of the most common materials for card-shaped data carriers (such as identity cards, payment cards, etc.), which have also been shown experimentally to be the most suitable for generating/conveying the fluorescent property. However, it should be noted that this list is merely exemplary and that any suitable material, in particular plastic material, can be used.

Refined materials are understood to be all materials/films that are optically refined in some way, for example by the introduction (e.g. extrusion) of optically active particles (e.g. glitter effects), etc. Such optically active particles do not impair the disclosed method and its effect.

According to a further embodiment, the method further comprises cutting out the irradiated area such that the edges of the cut-out irradiated area exhibit the fluorescent property.

For example, a material, in particular a card-shaped material (e.g. of a card-shaped data carrier) could be irradiated over the entire surface or, for example, only partially irradiated with the laser in an edge area (i.e. for example in a band that runs around an intended edge of the finished card-shaped data carrier). The card body of the card-shaped data carrier can then be cut out in such a way that the cut edge lies in the irradiated area. This creates an at least partial fluorescent property of the edge of the material. Furthermore, it is also conceivable that the irradiated area itself is cut out with the laser, so that a fluorescent property is imparted to the cut edge by cutting it out with the laser (and the associated irradiation of the cut edge). The term irradiated area can then refer either to a material that has already been irradiated within the cut-out area or to a material that has not been irradiated before, so that the irradiated cut edge is the only fluorescent area and the cut-out area thus becomes an irradiated area.

According to a further embodiment, the material has a flat design. The method further comprises inserting the material as an insert into a card-shaped data carrier.

As a result, for example, flat inserts with corresponding fluorescent properties can be prefabricated, which can then be laminated into card-shaped data carriers. The material can therefore be, for example, a single layer of a corresponding plastic material (e.g. PC, refined materials (i.e. with corresponding fillers/finishing pigments, as described above), PET, ABS. Bio PC, PVC, etc.), which is treated with the process to imprint a fluorescent property. The corresponding insert can then be co-laminated into the card-shaped data carrier (which usually consists of several layers laminated together), i.e. for example inserted into a corresponding recess in one of the layers (for example in a core layer which is only covered by transparent layers) and co-laminated. The insert is therefore generally smaller than the card-shaped data carrier. In this way, for example, prefabricated fluorescent security features or other fluorescent optical effects can be produced, which only need to be laminated in when laminating the card-shaped data carrier.

According to a further aspect, a document is provided, wherein a fluorescent property has been imparted to the document at least in sections using the method described above. Such a document may, for example, be a card-shaped data carrier, a banknote, an identity card, a passport, or any other document. For example, fluorescent security features can be generated in such a document using the method described above. The method can be carried out according to any of the embodiments described above.

In summary, the present disclosure is aimed at post-processing, for example in a finishing operation, the card body, which is produced and already personalized per se, for example and without limitation, using a $CO_2$ laser or a fiber laser, in order to introduce fluorescent effects into the card which are recognizable when illuminated with UV light. The fluorescent effects can be applied to large areas, i.e. everywhere on the front and/or back of the card. It is assumed that in the case of laminated card-shaped data carriers, the two outer film layers in particular are chemically altered by the laser (the exact chemical process is not yet clear to the inventors). The generation of fluorescent effects by means of a CO or fiber laser has the advantage that no additional production step such as the introduction/application of fluorescent inks in or on the card is required. Furthermore, the laser-based generation of fluorescent effects offers the advantage of design diversity, as the fluorescent effects can be generated anywhere on the front and/or reverse side.

BRIEF DESCRIPTION OF THE DRAWINGS

In the following, the enclosed drawings are used to describe embodiments in more detail. The illustrations are schematic and not to scale. Identical reference signs refer to identical or similar elements. The figures show.

DETAILED DESCRIPTION

The illustrations in the figures are schematic and not to scale. If the same reference signs are used in different figures in the following description of the figures, these refer to the same or similar elements. However, identical or similar elements may also be designated by different reference signs.

Figure 1:
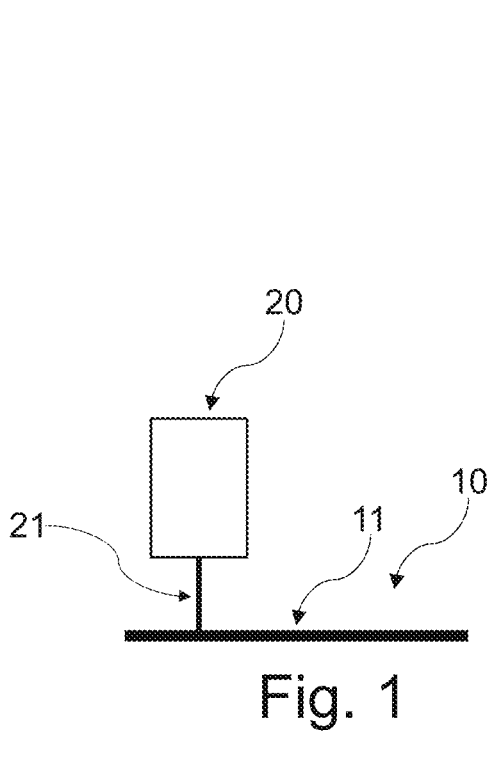
FIG. 1 shows an exemplary and highly schematic structure of a device with a laser which can be used to carry out a method for generating a fluorescence characteristic.
Figure 2:
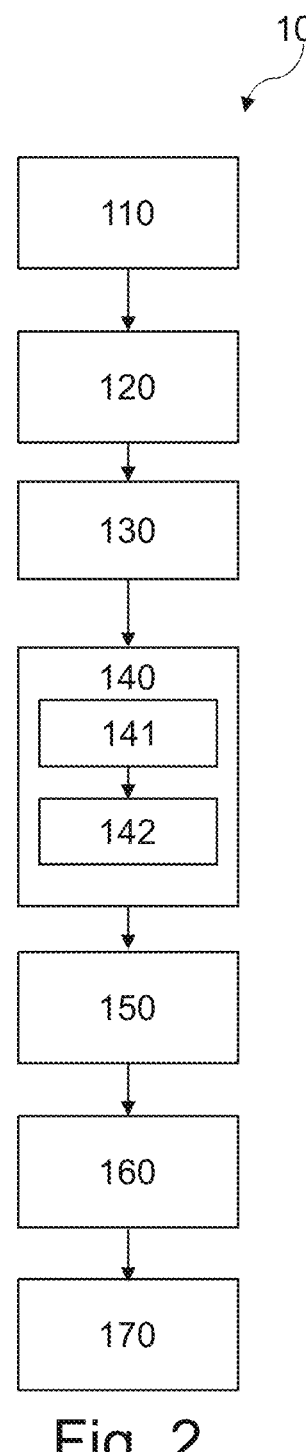
FIG. 2 shows a flow chart of a method for generating a fluorescent property in a material.

FIG. 1 shows a highly schematic structure for carrying out the method 100 disclosed herein (see FIG. 2). A laser 20 is arranged above a material 10, here exemplarily in the form of a card-shaped data carrier 10, so that the laser 20 can selectively irradiate the material 10 in sections (or section wise), i.e. so that a laser beam 21 can be guided over the material 10 in a position-variable manner. The laser 10 can, for example, be attached to a two-dimensional guide (not shown) or can comprise a corresponding adjustable lens system (not shown) in order to vary the point of impact of the laser beam 21 on the material 10. In addition, both the laser 20 and any existing guide or lens system or any other suitable mechanism or electronics for changing the point of impact of the laser beam 21 on the surface 11 of the material 10 can be connected to a controller (not shown), which controls the corresponding components accordingly. The controller can, for example, control the laser parameters (e.g. power, pulse duration, wavelength, etc.), the laser position (including an angle of incidence of the laser beam 21 on the surface 11 of the material 10), as well as the speed of movement of the laser beam 21 in order to perform the method of FIG. 2.

With reference to the flowchart in FIG. 2, and with continued reference to FIG. 1, a method 100 for generating a fluorescent property in a material 10 is now described. The method begins with providing 110 the material 10 and providing 120 the laser 20. The steps 110 and 120 can take place in parallel.

The material 10 can, for example, be a card-shaped material 10, such as a card-shaped data carrier 10, which can be designed as an identity document, as a payment card, or as any other card-shaped data carrier 10. In the following, the method 100 is described with reference to a card-shaped data carrier 10. However, it should be recognized that the material can in principle be performed on any suitable material 10 or object.

The providing 110 of the card-shaped data carrier 10 can, for example, occur automatically on a conveyor belt. For example, a depositing device can deposit the material to be irradiated on the conveyor belt. The conveyor belt can then, for example, continue to run at certain time intervals for arranging (step 130) the card-shaped data carrier 10 in a beam path of the laser 20, i.e. under an area that the laser beam 21 (FIG. 1) can irradiate, in order to move the respective card-shaped data carrier 10 to be irradiated or an area that the laser 20 can irradiate under the laser 20. However, this is only an example, and the card-shaped data carrier 10 can be provided in any suitable manner.

The method 100 may take place in a stand-alone device, or the device for performing the process (i.e. at least the laser 20) may also be part of a wider production machine.

The laser 20 is preferably a CO2 laser 20 or a fiber laser 20. These types of lasers have been shown to be particularly effective in producing the fluorescent property and have been described hereinabove.

The method 100 continues with the at least section wise irradiating 140 of the surface 11 of the card-shaped data carrier 10 in this example. For example, the laser 20 can irradiate a certain pattern or motif (such as the portrait shown in FIGS. 3 to 5) on the surface 11. In addition, however, part of a larger material can also be cut out with the laser itself, for example, making the edge of the cut-out material fluorescent. It is assumed that by irradiating the surface 11 (or also the cut edge, i.e. generally by irradiating the material with the laser) of the card-shaped data carrier 10 (or generally of the material 10), the material 10 is chemically changed in such a way that it exhibits a fluorescent property. In particular, molecules with conjugated double bonds show fluorescence, as the electrons move across several atoms and are therefore easy to excite. It is therefore assumed that such a change in the material 10 takes place during irradiation with the laser under the right conditions.

Card-shaped data carriers 10 are usually laminated from a multi-layer structure. In the case of such laminated layer structures, it is assumed in particular that the laser 20 chemically changes the two outer layers in such a way that a fluorescent property is formed in these layers.

CO2 lasers and fiber lasers in particular have proven to be effective in generating the fluorescence property. However, other types of laser are also conceivable in principle.

Irradiating 140 takes place until visible traces of smoke 12 (see FIGS. 3 to 5), for example yellowish discoloration, are formed. It has been shown that the stronger traces of smoke 12 are formed, the stronger the fluorescence property is. The duration of the irradiation and the parameters of the laser also depend in particular on the irradiated material. The following materials have proven to be particularly suitable for generating the fluorescent property: opaque and/or transparent polycarbonates (PC), refined materials (for example with refining pigments such as OVI pigments), opaque and/or transparent polyethylene terephthalate (PET), acrylonitrile-butadiene-styrene copolymer (ABS), organic polycarbonates (PC) and polyvinyl chloride (PVC). However, other materials are in principle also conceivable for use with the method disclosed herein.

The laser parameters (power, pulse frequency, wavelength, pulse energy, etc.) and in particular the required irradiation duration naturally depend on the irradiated material. However, the following parameters have proven to be particularly effective:

CO2 laser: Power: 60 W to 80 W; wavelength: 10.6 μm; repetition rates up to 100 kHz with pulsed operation.

Fiber laser: power 20 W to 30 W; wavelength: 1064 nm; repetition rates: 25 kHz-600 kHz with full power, 1 kHz to 25 kHz with linearly reduced power in pulsed operation; pulse energy: 0.8 mJ at 25 kHz repetition rate.

However, these parameters are only examples and other parameters may also prove to be effective. In particular, the laser does not necessarily have to be operated in pulsed mode. What is important overall is the energy introduced, which is determined in particular by the laser power, the irradiation duration and the pulse frequency (in pulsed operation, as the pulse frequency also influences the effective irradiation duration). The irradiation duration for the respective material can be controlled in particular via the degree of traces of smoke 12. For this, it has to be ensured that first traces of smoke 12 are visible, but they must not be too strong or too weak, as the fluorescence property is not sufficiently developed if they are weak (see FIG. 5) and the material 10 can be damaged if they are too strong. However, the traces of smoke do not necessarily have to be visible to the naked eye, but can also be detected in other ways, for example using aids such as microscopes or similar. The traces of smoke 12 thus indicate a visually perceptible measure of the laser energy applied to the respective material.

Optionally, the at least section wise irradiating 140 can initially comprise irradiating 141 at a first angle and then irradiating 142 at a second angle in order to form a direction-dependent fluorescence characteristic. For example, a first motif (such as a text and/or graphic motif) may be irradiated at the first angle and a second motif at the second angle. Irradiating at an angle generates a direction-dependent fluorescence so that, for example, a fluorescent tilt image can be produced, which is particularly suitable as a security feature. It is also conceivable to irradiate at more than two angles.

Optionally, the method 100 may further comprise a removal 150 of the traces of smoke 12 after irradiating 140. The traces of smoke can, for example, be ground out, rubbed off, polished or otherwise removed. As a result, the irradiated motif 14 is only visible as fluorescence under UV light, but no longer in daylight.

In addition, the method 100 may optionally comprise cutting out 160 the irradiated area 13. In particular, the irradiated area 13 may be configured such that the cut edges have also been irradiated (in particular also by the irradiated area 13 itself being cut out by the laser). In this way, a fluorescent property can be achieved in the edges.

In addition, the method 100 may optionally comprise inserting 170 the material 10 (if the material is not the card-shaped data carrier itself) as an insert into a card-shaped data carrier. In such an embodiment, the material 10 is thus also designed to be two-dimensional, but smaller than the card-shaped data carrier. For example, the irradiated material 10 can only comprise one layer and be smaller than the card-shaped data carrier. The insert prepared in this way can then, for example, be inserted into a recess in an inner layer of the card-shaped data carrier before lamination and laminated in.

Figures 3, 4, 5:
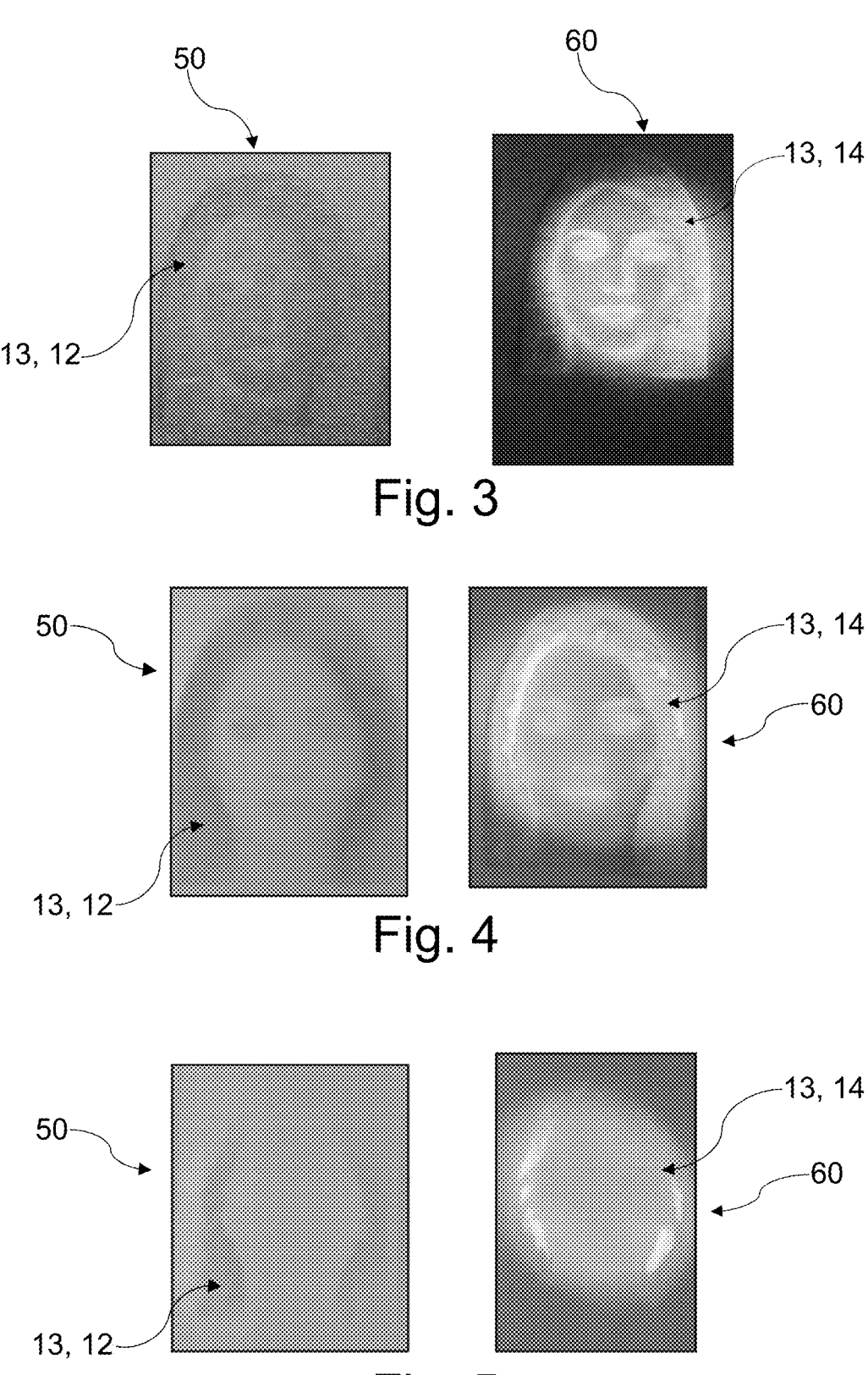
FIG. 3 shows an example of a fluorescent motif applied to a card-shaped data carrier without UV illumination (traces of smoke) and with UV illumination (fluorescence), whereby the material comprises refining pigments (e.g. OVI pigments, Optical Variable Image).
FIG. 4 shows an example of a fluorescent motif applied to a card-shaped data carrier without UV illumination (traces of smoke) and with UV illumination (fluorescence) with strong formation of traces of smoke.
FIG. 5 shows an example of a fluorescent motif applied to a card-shaped data carrier without UV illumination (traces of smoke) and with UV illumination (fluorescence) with weak formation of traces of smoke.

FIG. 3 shows an exemplary fluorescent motif 14, which can be produced using the method 100 described herein. In this example, the irradiated material also has refining pigments (e.g. OVI pigments; Optical Variable Image). The refining pigments do not influence the fluorescence properties generated. The left side of FIG. 3 shows a "daylight view" 50, i.e. a view without UV excitation light. Here, the traces of smoke 12 are clearly visible on the irradiated area 13. The irradiated area 13 describes the area that forms the motif 14 and was traversed by the laser 20. The right-hand side of FIG. 3 shows a UV light view 60, i.e. a view in which the material treated with the method 100 is exposed to an ultraviolet excitation light. It is clearly visible that a fluorescent property has been generated in the material 10 in the irradiated areas 13.

FIGS. 4 and 5 show a comparison of the fluorescence property generated with weak formation of traces of smoke 12 (FIG. 5) compared to strong formation of traces of smoke 12 (FIG. 4). Here, it is clearly visible that the fluorescence characteristic is significantly weaker with low formation of traces of smoke 12, i.e. with too short irradiation and/or irradiation with too little energy (overall with too little laser energy applied for the respective material), compared to FIG. 4.

The method 100 described herein thus offers a way of providing materials such as card-shaped data carriers 10 with a fluorescent property without having to introduce additional materials such as fluorescent color pigments. Instead, the fluorescent effect is inherently imprinted on the material 10. This enables a wide variety of designs and, in particular, personalization with fluorescent effects after the actual production of the material 10, such as a card-shaped data carrier 10, has already been completed.

In addition, it should also be pointed out that "comprising" or "having" does not exclude other elements or steps and "one" or "a" does not exclude a plurality. Furthermore, it should be noted that features or steps described with reference to one of the above embodiments may also be used in combination with other features or steps of other embodiments described above. Reference signs in the claims are not to be regarded as a limitation.

The invention claimed is:

1. A method for generating an at least partial fluorescent property in a material, the method comprising:
   providing the material;
   providing a laser;
   arranging, the material in a beam path of the laser, such that the laser can selectively section wise irradiate the material; and
   at least section wise irradiating a surface of the material with the laser;
   wherein the at least section wise irradiating of the surface of the material with the laser is performed until visible traces of smoke are formed on the irradiated areas of the surface of the material, whereby a fluorescent property is generated in the irradiated areas.

2. The method of claim 1, wherein the laser is one of a CO2 laser and a fiber laser.

3. The method of claim 2, wherein, if the laser is a CO2 laser, the CO2 laser is operated at a power between 60 W and 100 W and a wavelength of 10.6 μm; and
   wherein, if the laser is a fiber laser, the fiber laser is operated with a power between 20 W and 30 W and a wavelength of 1064 nm.

4. The method of claim 3, wherein irradiating the surface of the material is carried out with a pulsed laser.

5. The method claim 4, wherein irradiating the surface of the material comprises at least irradiating the surface under a first angle to generate a first fluorescence and irradiating the surface under a second angle to generate a second fluorescence to thereby generate a direction-dependent fluorescence property such that the respective fluorescence is only visible under the respective angle.

6. The method of any claim 5, wherein the material is a card-shaped material.

7. The method of claim 6, wherein the card-shaped material comprises a layered structure having a plurality of layers laminated together.

8. The method of claim 7, wherein the card-shaped material is a card-shaped data carrier.

9. The method of claim 8, wherein the card-shaped data carrier is one of an identity card, a data page of a passport, a driver's license, and a payment card.

10. The method of claim 9, wherein the section wise irradiating of the surface is carried out according to a pattern or motif in order to generate a corresponding fluorescent motif.

11. The method of claim 10, wherein the irradiated areas irradiated during the irradiating are selected such that the generated fluorescence property serves as a safety feature.

12. The method of claim 11, further comprising removing the traces of smoke from the surface-after irradiating.

13. The method of claim 12, wherein the material comprises at least one of the following materials:

opaque and/or transparent polycarbonates, PC;

refined materials;

opaque and/or transparent polyethylene terephthalate, PET;

acrylonitrile-butadiene-styrene copolymer, ABS;

bio Polycarbonates, PC, and polyvinyl chloride, PVC.

14. The method of claim 13, further comprising cutting out the irradiated area such that the edges of the cut-out irradiated area exhibit the fluorescent property.

15. The method of claim 14, wherein the material has a flat design; and wherein the method further comprises inserting the material as an insert into a card-shaped data carrier.

* * * * *